(12) United States Patent
Buhlinger et al.

(10) Patent No.: US 11,586,777 B2
(45) Date of Patent: Feb. 21, 2023

(54) DEVICE, SYSTEM AND METHOD FOR VERIFYING AN INTEGRITY STATUS OF A DEVICE

(71) Applicant: Robert Bosch GmbH, Stuttgart (DE)

(72) Inventors: Tobias Buhlinger, Rodgau (DE); Alexander Breitenbach, Frammersbach (DE); Julien Rausch, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/062,113

(22) Filed: Oct. 2, 2020

(65) Prior Publication Data
US 2021/0124846 A1 Apr. 29, 2021

(30) Foreign Application Priority Data
Oct. 28, 2019 (DE) .................. 10 2019 216 527.3

(51) Int. Cl.
*G06F 21/73* (2013.01)
*G06F 21/44* (2013.01)
*G06F 21/60* (2013.01)
*G06F 21/64* (2013.01)

(52) U.S. Cl.
CPC .............. *G06F 21/73* (2013.01); *G06F 21/44* (2013.01); *G06F 21/602* (2013.01); *G06F 21/64* (2013.01); *G06F 2221/0751* (2013.01)

(58) Field of Classification Search
CPC ........ G06F 21/73; G06F 21/44; G06F 21/602; G06F 21/64; G06F 2221/0751
See application file for complete search history.

(56) References Cited

U.S. PATENT DOCUMENTS

| | | | |
|---|---|---|---|
| 8,484,474 B2* | 7/2013 | Batke | G06F 21/44 713/175 |
| 9,122,605 B2* | 9/2015 | Bell | G05B 23/02 |
| 10,127,374 B2* | 11/2018 | Newell | G06F 21/44 |
| 10,375,106 B1* | 8/2019 | Roesler | G06F 21/57 |
| 10,956,615 B2* | 3/2021 | Shell | G06F 9/4406 |
| 11,134,072 B2* | 9/2021 | Falk | H04L 63/20 |
| 2005/0262086 A1* | 11/2005 | Ta | H04L 63/0823 707/999.009 |

(Continued)

OTHER PUBLICATIONS

Sye Loong Keoh et al "Securing Industrial Control System: An End-to-End Integrity Verification Approach", by Keoh et al., 2015, ICSS 9 pages (Year: 2015).*

*Primary Examiner* — Catherine Thiaw
(74) *Attorney, Agent, or Firm* — Maginot, Moore & Beck LLP

(57) ABSTRACT

A device includes at least one first and one second module configured to cooperate to solve a task and/or are configured to communicate with a higher-level apparatus, a certification module configured to issue a cryptographic signature for each of the at least one first and second module, and an identity generation module configured to form a first code as an identity of the first module from a signature of the first module, to form a second code as an identity of the second module from a signature of the second module, and to form an overall code from the first and the second codes. The certification module is further configured to sign the overall code with a key in order to issue a unique certificate for the device, which biuniquely identifies the device.

12 Claims, 4 Drawing Sheets

(56) References Cited

U.S. PATENT DOCUMENTS

| | | | |
|---|---|---|---|
| 2010/0077217 A1* | 3/2010 | Callaghan | H04L 9/3247 713/182 |
| 2011/0066838 A1* | 3/2011 | Takayama | H04L 9/3236 713/2 |
| 2011/0158485 A1* | 6/2011 | Hsieh | G06F 21/64 382/119 |
| 2013/0166899 A1* | 6/2013 | Courtney | G06F 9/44505 713/100 |
| 2015/0264080 A1* | 9/2015 | Bu er | H04L 63/1416 726/23 |
| 2016/0013939 A1* | 1/2016 | Jun | H04L 9/003 380/44 |
| 2017/0288867 A1* | 10/2017 | Collier | H04L 9/3268 |
| 2017/0357496 A1* | 12/2017 | Smith | H04L 9/0662 |
| 2018/0255458 A1* | 9/2018 | Villar | H04W 12/069 |
| 2020/0169421 A1* | 5/2020 | Farkash | H04L 63/101 |
| 2020/0186357 A1* | 6/2020 | Laitinen | H04L 9/3268 |
| 2020/0267187 A1* | 8/2020 | Singh | H04L 9/0637 |

* cited by examiner

DEVICE, SYSTEM AND METHOD FOR VERIFYING AN INTEGRITY STATUS OF A DEVICE

This application claims priority under 35 U.S.C. § 119 to patent application no. DE 10 2019 216 527.3, filed on Oct. 28, 2019 in Germany, the disclosure of which is incorporated herein by reference in its entirety.

The disclosure relates to a device or machine, a system and a method for verifying the integrity status of such a device.

BACKGROUND

A machine or industrial plant contains a plurality of devices. Each device has a plurality of modules, such as a configuration module or a software module. Each device has a specific task in the machine or the industrial plant. If necessary, at least two of the devices or their modules cooperate to solve a task. The devices or their modules exchange data with each other, such as sensor data, i.e. actual values from the operation of the machine, or control commands with setpoint values for controlling a drive, or similar. In addition, in some applications data are transmitted to apparatuses located externally from the machine or industrial plant. Such apparatuses are, for example, higher-level control systems or data management systems. The apparatuses may also store and use data from other machines or industrial plants. This means that a large number of data items must be managed both in the machine and in the externally arranged devices.

A problem occurs when one of the devices is exchanged for a foreign device without authorization, or the configuration of an application program of a device is changed without authorization. This allows the operation of the device and the system or the industrial plant to be manipulated. In addition or alternatively, due to the manipulation an error can occur in the configuration, for example, so that rejects are produced. The same applies if data is imported into a device of the system from an external site without authorization or due to an incorrect connection of devices, wherein such data, for example, corrupt data from sensors of the system or specify different, in the worst case incorrect, setpoint values. The operation of the device can also be manipulated in this way.

All of this can lead to at least undesirable results in the operation of the device, or even to dangerous states of the system. This can result in unwanted downtimes of the device or system or the industrial plant. These situations are also unacceptable in terms of the safety of the device, particularly in an industrial environment, where there are predetermined safety requirements.

Another problem is that for quality assurance of manufactured products and/or for troubleshooting it should always be possible to determine with certainty the devices and or modules which were used to manufacture a product. This is the only way to safely exclude the possibility of incorrect configuration of the device as a source of error in the event of production errors, for example.

SUMMARY

The object of the disclosure is to provide a device or a machine, a system and a method for verifying an integrity status of such a device, with which the above problems can be solved. In particular, a device or a machine, a system and a method for verifying an integrity status of such a device will be provided, with which the manipulation of a device can be tested with high certainty so that long unplanned downtimes of the device or the machine or the system can be prevented.

The above mentioned object is achieved by a device as described herein. The device has at least one first and one second module that interact to solve a task and/or are designed for communicating with a higher-level apparatus, a certification module designed to issue a cryptographic signature for each module, an identity generation module which is designed to form a first code as the identity of the first module from the signature of the first module, to form a second code as the identity of the second module from the signature of the second module, and to form an overall code from the first and second codes, wherein the certification module is designed to sign the overall code with a key in order to issue a unique certificate for the device which biuniquely identifies the device.

The device is designed in such a way that it is possible to check securely whether the device is free of malware and whether no other unauthorized manipulation of the system has occurred. For example, the configuration of a fieldbus connected to the device, or the entire configuration of a controller, can be checked for reconfiguration in a forgery-proof manner at any time.

The device makes it possible to check in a simple way whether manipulation of the system configuration, a software/firmware configuration of the device, the number, type and configuration of connected peripheral components and their bus configuration has taken place, and thus whether the system integrity is maintained. This makes it a simple matter to determine whether only the desired software is installed.

Another advantage is that the device described above is also useful in finding the cause of operating errors. In particular, in the event of a discrepancy in the production quantity of the system as a result of a device error, the version of the controller firmware and the configuration including all application programs can be excluded as a source of error using the device described above.

The device is designed in such a way that every system-internal module and every peripheral connected to the device is assigned to the device in a one-to-one manner. Along with the data exchanged between devices of the system, information about the respective device that generated the data can also be transmitted.

This ensures traceability of the origin of all data relating to a machine of the system and thus guarantees the security of both the data and the operation of the device and the system.

Optionally, the device can also be integrated into a complex, in particular a machine or a machine complex, in which at least one other device is also arranged, thus allowing the origin of the data from the individual devices to be easily determined biuniquely at all times. This also makes it possible to assign data biuniquely from, for example, a plurality of industrial control devices for controlling peripherals that are connected to the drives and/or at least one industrial control device via logic modules or drive devices. The manipulation of data is therefore at least more difficult than before.

Overall, the device described above allows for a very simple, secure and reliable operation of the system or a machine, or a higher-level machine complex containing the machine, or a higher-level industrial plant. It is then possible to react quickly to the operating states of the device or system as they occur. All these properties result in a very efficient operation of the device and hence the system.

The first module may have at least one application program designed to use at least one parameter to solve a task, and/or designed to cooperate with a second application program or to communicate with the higher-level apparatus.

The second module may have at least one configuration which has at least one parameter that can be used for solving the task and/or for communication with the higher-level apparatus.

Optionally, the device additionally has a third module connected to the device via a data network, wherein the identity generation module is designed to form a third code from the signature of the third module and to form the overall code from the first to third codes.

It is conceivable that the device is a modular control device and that the data network is a fieldbus. Additionally or alternatively, the first to third code can each be a hash value of the signature and the overall code can be a hash value of the first to third codes.

The certification module can have a private key which contains a public key, wherein the certification module is designed to use the private key for signing the overall code for the device.

According to an option, the certification module is designed to send its public key to the first or second module in order to check the identity of the first or second module.

The above-mentioned object is also achieved by a system as described herein. The system has at least two of the devices described above, one of the devices being a control device and another of the devices being a drive device or a tool or a transport device.

It is conceivable that each device is designed to permit an exchange of data when exchanging data with another device of the system or the higher-level apparatus, only if the data are provided with a sub-certificate.

In a specific embodiment, the data can be operating state data or comprise a control command of a device.

In another specific design, the data comprise at least one parameter that can be used in controlling the drive of at least one element of the system.

In yet another specific design, the data comprise an IP address and/or a name of the device.

The system described above may additionally have an apparatus arranged externally to the at least one device, wherein the apparatus stores the root certificate of the at least one device and the apparatus is designed to check data received from a device for trustworthiness using the certificate of the device.

The above-mentioned object is also achieved by a method for verifying an integrity status of a device, as described herein. The device has at least one first and one second module designed to cooperate and/or communicate with a higher-level apparatus for the purpose of solving a task, the method comprising the following steps: issuing a cryptographic signature for each module using a certification module, and forming a first code as the identity of the first module from the signature of the first module using an identity generation module, forming a second code as the identity of the second module from the signature of the second module using the identity generation module, and forming the first and second codes of an overall code using the identity generation module, and signing the overall code with a key using the certification module in order to issue a unique certificate for the device that biuniquely identifies the device.

The method achieves the same benefits as those cited above in relation to the device.

The method can also comprise the steps: after receiving a predetermined command, verifying using the certification module that a unique certificate currently being created for the device matches a certificate stored for the device, and issuing data that indicate a manipulation of the unique certificate currently being created for the device if the unique certificate currently being created for the device does not match the certificate stored for the device.

Further possible implementations of the disclosure also comprise combinations of features of the disclosure either described previously or in the following in relation to the exemplary embodiments, which are not explicitly mentioned. A person skilled in the art will also be able to add individual aspects as improvements or additions to each basic form of the disclosure.

BRIEF DESCRIPTION OF THE DRAWINGS

Hereafter, the disclosure is described in more detail with reference to the attached drawing and on the basis of exemplary embodiments. In the figures.

In all figures, identical or functionally equivalent elements are labelled with the same reference signs, unless otherwise indicated.

DETAILED DESCRIPTION

Figure 1:
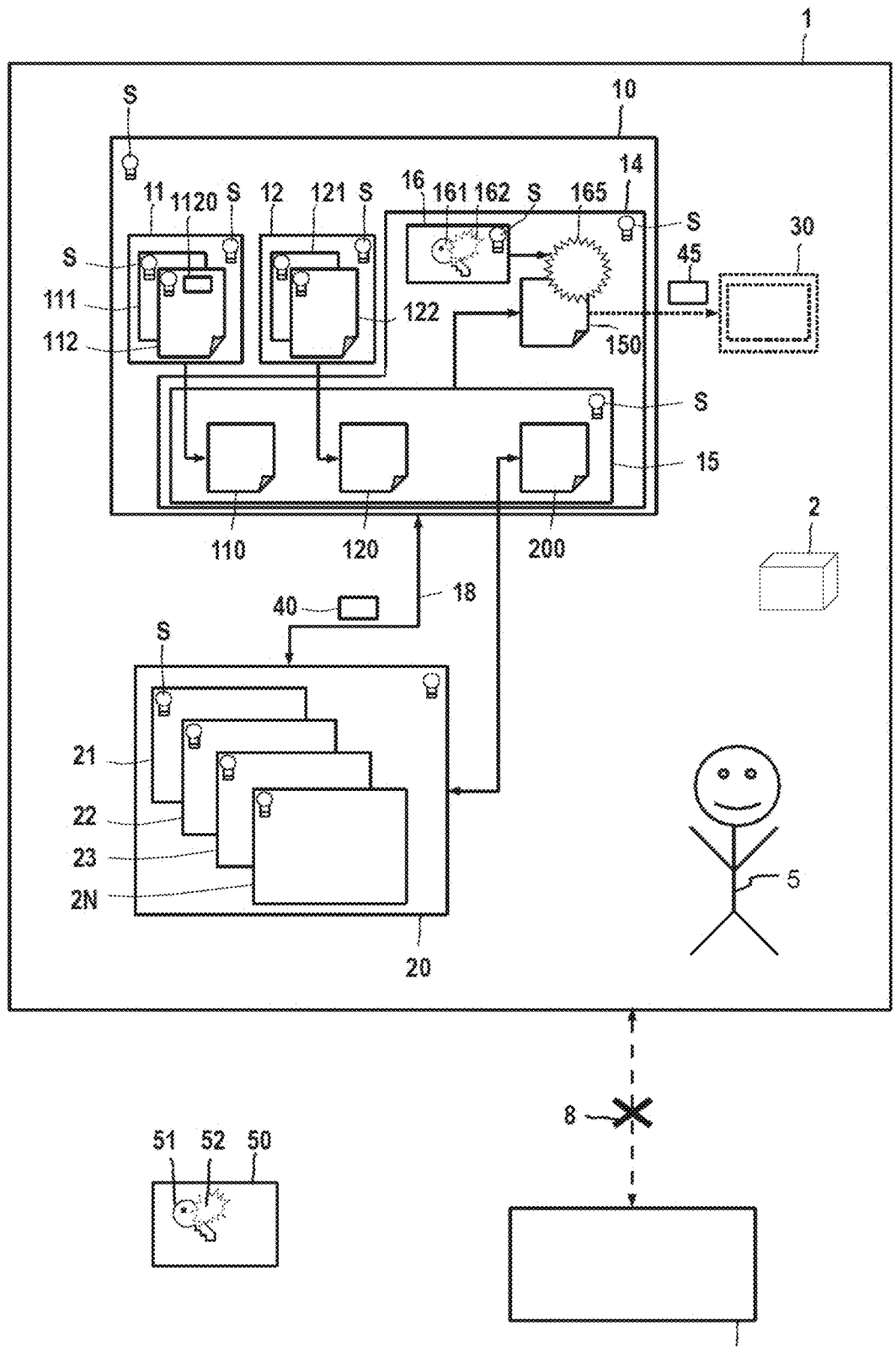
FIG. 1 shows a block diagram of a system with at least one device or functional module according to a first exemplary embodiment.

FIG. 1 schematically shows a system 1 according to a first exemplary embodiment, in which objects 2 can be treated. At least one user 5 can be active in the system 1. A device 7 that is arranged externally to the system 1 cannot exchange data with the system 1, as described in more detail below.

The system 1 has at least one machine or device 10, a data network 18, which is designed in particular as a fieldbus, a peripheral module 20 with peripheral devices 21, 22, 23 to 2N and optionally an external apparatus 30, which is arranged externally to the machine or the device 10 and the peripheral devices 21, 22, 23 to 2N. The apparatus 30 is in particular a higher-level apparatus to the device 10. The fieldbus is designed to connect sensors and/or actuators and/or control systems, such as control devices etc., for transmission of electrical signals. The fieldbus is any fieldbus of the known field bus types, such as in particular Sercos, CAN, FlexRay, Profibus, Ethernet, etc. The peripheral devices 21 to 2N are, for example, drive controllers or sensors or actuators or switches or encoders or other devices that can be controlled by the application programs 121, 122.

Between the machine or the device 10 and the peripheral devices 21 to 2N, data 40 can be exchanged using the data network 18. Data 45 of the device 10 can be displayed and/or checked and/or analyzed on the external apparatus 30. The data 45 is integrity data containing information relating to the identity of the device 10 and the peripheral module 20 connected thereto.

The system 1 can be an industrial plant, such as an assembly or dismantling plant for assembling an object 2 or for dismantling the object 2. In addition or alternatively, the movement or the processing of the object 2 can be controlled with the device 10. The device 10 in this case is, for example, at least the controller of a welding device or a screwing tool or a printing machine or a stirrer or any other machine or any other device, as described below. In particular, the device is a modular control device.

The device 10 has a configuration module 11, a software module 12, a sandbox software container 14, an identity generation module 15 and a certification module 16. The sandbox software container 14 comprises at least one of the modules 15, 16.

The configuration module 11 has at least one specific configuration 111, 112 stored for a specific configuration of hardware of the device 10 or for the fieldbus. In particular, the hardware of the device 10 is at least one memory for storing data, at least one processor for processing the data and at least one additional component which cooperates with the processor to perform processing and/or treatment of the object 2. The at least one specific configuration 111, 112 comprises at least one parameter 1120. Parameters 1120 are, for example, the size of a current which is to be used for welding a joint, the maximum tightening torque for a screw, the range of values in which a temperature sensor is designed to measure, etc. Of course, depending on the type of device 10, any other parameters 1120 can be selected or used.

The software module 12 has at least one application program 121, 122 that can be executed using the hardware, and at least one configuration 111, 112 of the configuration module 11. At least one application program 121, 122 is designed to perform at least one function of the device 10. Such a function of the device 10 can include producing a welding connection and/or closing a bottle with a rotary closure, screwing a screw into at least one component, the detection of a physical quantity and/or the adjustment of a switch and/or a lever and/or driving an element into motion, etc. Of course, any other functions of the device 10 are possible, which can be controlled with at least one application program 121, 122.

In the case of the device 10, each configuration 111, 112 of the configuration module 11 and each application program 121, 122 of the software module 12 fulfils a specific task or has a predefined function. The specific task or predefined function may be a treatment and/or positioning and/or processing of the object 2, or outputting the data 45 to the apparatus 30. Of course, any other task(s) and/or function(s) or combinations thereof are conceivable.

In addition, each module 11, 12, 14, 15, 16 of the device 10 and of the peripheral module 20 as well as the peripheral devices 21 to 2N thereof has a cryptographic signature S. In FIG. 1, for the sake of clarity, not all cryptographic signatures S have been labelled with a reference sign. The cryptographic signature S is a biunique signature for each component of the system 1, i.e. for the device 10, each of the modules 11, 12, 14, 15, 16, etc.

The identity generation module 15 generates a code 110 for the configuration module 11 from the signatures S of the module 11 and the configurations 111, 112. The code 110 is therefore a specific feature of the configuration module 11. For example, if the configuration module 11 has only the specific configuration 111, i.e. only a single specific configuration, then the code 110 is a specific feature, which is formed from the signature S of the module 11 and from the signature S of the specific configuration 111. Otherwise, the identity generation module 15 generates a specific feature as code 110 from the specific features of at least two specific configurations 111, 112 and the module 11. Here, the specific features of the specific configurations 111, 112 and/or the module 11 can be longer or shorter than the code 110.

In addition, the identity generation module 15 generates a code 120 for the software module 12, which is a specific feature of the software module 12. For example, if the software module 12 has only the application program 121, for example, i.e. only a single application program, then the code 120 is a specific feature which is formed from the signature S of the module 12 and the signature S of the application program 121. Otherwise, the identity generation module 15 generates a specific feature as code 120 from the specific features of at least two application programs 121, 122 and the module 11. The specific features of the application programs 121, 122 and/or the module 12 can be longer or shorter than the code 120.

In addition, the identity generation module 15 generates a code 200 for the peripheral module 20. For example, if the peripheral module 20 has only one of the peripheral devices 21, 22, 23 to 2N, for example, the peripheral device 21, then the code 200 is a specific feature which is formed from the signature S of the peripheral module 20 and the signature S of the peripheral device 21. Otherwise, the identity generation module 15 generates a single special feature for the peripheral module 20 as code 200 from the specific features of the total number of peripheral devices 21 to 2N present.

In addition, the identity generation module 15 generates a common code 150 from the codes 110, 120, 200. The codes 110, 120, 200 can be different or the same length. The codes 110, 120, 200 can be longer or shorter than the code 150.

The module 16 uses the private key 161 to assign the code 150 a signature 165. The resulting certificate 150, 165 can be output to the external apparatus 30, for example, using the data 45. This allows a user 5 of the system 1 to check that the identity of device 10 matches the expected identity or not. The certificate 150, 165 identifies the device 10 biuniquely. In other words, the certificate 150, 165 is a proof of the identity of the device 10.

At least one private key 161 for the device 10 is kept and securely stored in the module 16. The at least one private key 161 is protected from being read out of the associated module 16. The buyer or operator, for example a user 5, of the device 10 can generate their own private keys 161 in the desired module 16 and use them for their own purposes. Each private key 161 has a public component 162, which is referred to as a public key.

The module 16 also assigns the signatures S to the modules 11, 12, 15. In addition, the module 16 also assigns the signatures S to the configurations 111, 112 and to the application programs 121, 122. In addition, the module 16 can assign the signatures S to the peripheral module 20. The signatures S are generated on the device 10 with a private key 161 of the at least one private key 161 mentioned above. This/these private key(s) 161 is/are managed in a protected memory. The public part 162 of the private key 161 is provided by the device 10 using, for example, the data 45. This allows the public part 162 of the private key 161 to be used in higher-level systems, such as engineering systems or audit systems, in particular of the apparatus 30, to verify and draw attention to changes in the configuration. In addition, the public part 162 of the private key 161 can be used in the module 16. The checking of at least one configuration change is described in more detail below.

With the help of cryptographic operations, a code 150 is therefore created with the module 16 as verification of the configuration of the device 10 and digitally signed with the module 16. The resulting certificate 150, 165 is issued on request, for example in the data 45. The certificate 150, 165 can be used to verify to third parties that the device 10 has not been manipulated.

If no manipulation has occurred, the verification or the certificate 150, 165 can be assigned to a device identity with complete confidence. However, if the device 10 has been manipulated, the certificate 150, 165 cannot be assigned to a device identity.

The identity is ensured with a biunique device identity based on a manipulation-proof "Root-of-Trust" on each individual device. Third-party devices or users 5 of the system 1 can request a new certificate 150, 165 cyclically, i.e. after a predetermined period of time has elapsed, in order to check the integrity of their communication partners cyclically.

The verification by means of the certificate 150, 165 is automatically generated by the system 1. Within the system 1, an inventory process is started at this time with the module 16, which generates individual features of the modules 11, 12, 20. An individual feature can be, for example, a hash value or an abbreviated value of the respective object. For example, from a code with the value of "63" a hash value of 9 can be formed, which corresponds to the sum of the digits of the value "63". According to another example, from a code with the value of "789" the hash value of 7 can be formed, which corresponds to the initial figure of the value "789". In yet another example, a code with a value of "789" is used to form the hash value "79", which corresponds to the initial value and final value of the value "789". Of course, any other methods for generating hash values are possible.

An individual feature is generated for each installed piece of software or application program 121, 122. In addition, an individual feature is generated for any type of stored configuration. In addition, for example, an individual feature is generated for each connected peripheral device 21 to 2N on the data network.

The integrity module 15 combines all individual features present within the system 1 into an aggregate feature, in particular the code 150, and digitally signs this code with the signature 161 using the module 16.

The totality of all the features or the code 150 including the digital signature 165 with the private key 161 results in the above mentioned verification using the certificate 150, 165. This means that an entire system 1 can be easily checked for changes at any time.

Figure 2:
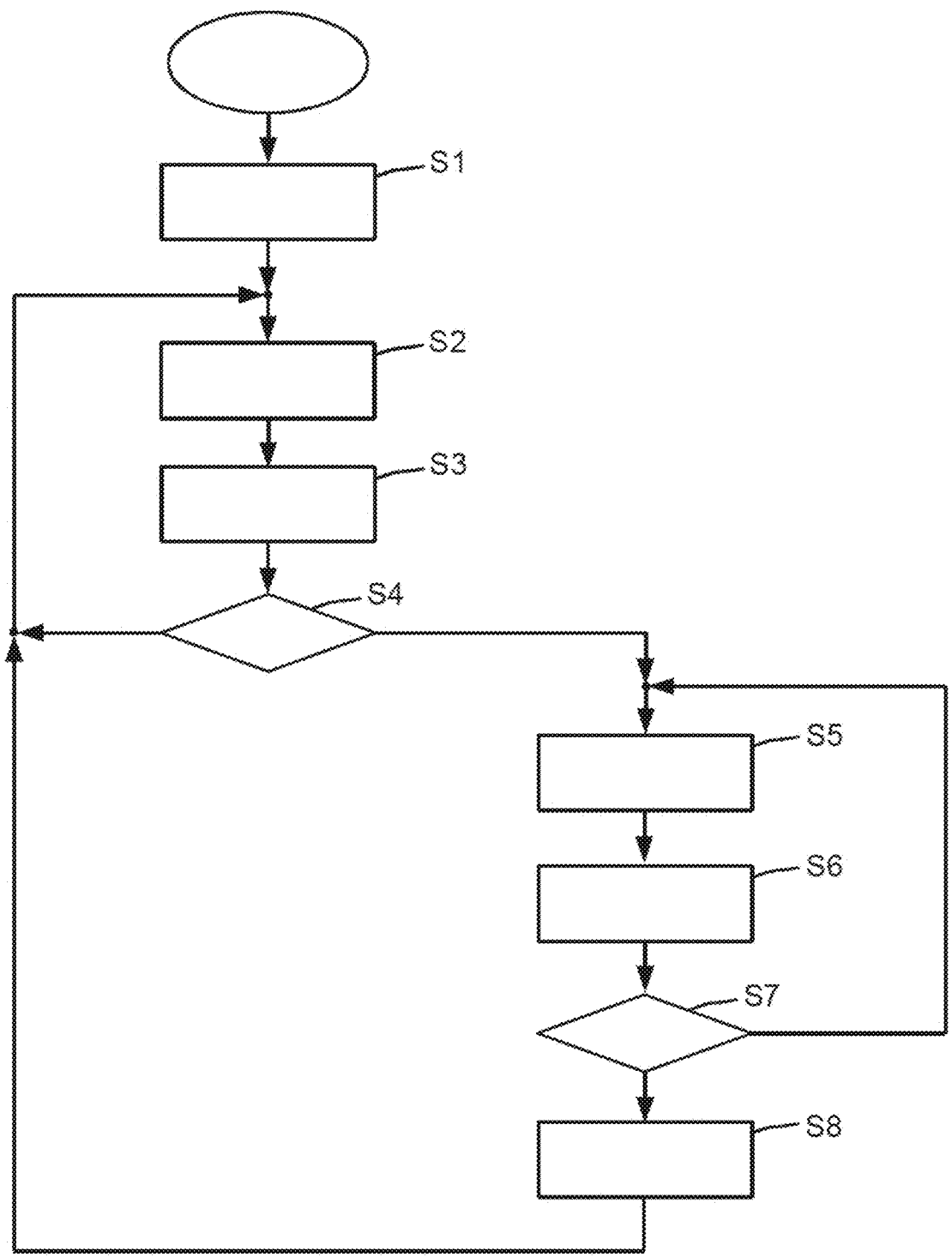
FIG. 2 shows a flowchart of a method for verifying an integrity status of a system according to the first exemplary embodiment.

FIG. 2 shows a method for verifying the integrity status of a device 10 or a system 1. This procedure involves assigning a cryptographic signature S to each module 11, 12, 15, 16, each configuration 111, 112, each application program 121, 122, and to the device 10 and the peripheral module 20 and its peripheral devices 21 to 2N.

After the start of the method of FIG. 2 therefore, the signatures S are generated in a step S1 at the time of development of at least one application program 121, which is firmware, for example. The signatures S can be applied at a suitable time in the manufacturing process of the device 10, in particular during the manufacturing process or at the end. This can be done using a certification device 50 that has at least one private key. The private key 51 has a public component, the so-called public key 52. Based on the private key 51, the certification device 50 issues a signature S or a certificate for the respective application program 121 at the request of the at least one application program 121 or the device 10, and sends it to the device 10 or the module 12. The certification device 50 generates the signature S or the certificate based on its private key 51. For this purpose, the certification device 50 signs the request from the respective application program 121 with the private key 51 and thus creates the signature S or the certificate. Thus, the signature S or the certificate is a trustworthy signature S or certificate for the respective application program 121. The flow then proceeds to a step S2.

In step S2 at least one application program 122, such as a customer-specific program, for example a PLC program (PLC=programmable logic controller), is installed on the device 10 and/or the system 1. Alternatively or additionally, configurations 111, 112 can be applied to the device 10 and/or the system 1, which comprise in particular a fieldbus configuration. Step S2 corresponds to an engineering operating state in which the module 16 is switched into a first operating state. The engineering operating state is one in which engineering of a control component of the device 10 takes place. In this state at least one of the application programs 122, which is in particular a PLC program, can be programmed and modified as required. In addition or alternatively, additional subscribers, such as the peripheral devices 21 to 2N, can be added to the data network 18 and configured as required. In addition or alternatively, all other customer software can be added as application program 122 or another configuration 111, 112. The flow then proceeds to a step S3.

In step S3, the module 16 generates the signature S of the application programs 121, 122 at runtime upon a specific command. This is carried out with the module 16, as previously described in relation to the application program 121 at step 51 and previously in relation to the codes 110, 120, 150. In the context of this command, the module 16 initiates a signing process for all components and modules 11, 12, 15 of the device 10 that do not yet have a signature S. The signatures S can be generated by arbitrary and/or different cryptographic mechanisms. The module 16, which is a stand-alone software module and, in particular, independent of the rest of the system 1, is responsible for this instruction or such a command. In addition to generation of the signature and identity using the certificate 150, 165, this software module 16 also has the task of monitoring all other modules 11, 12, 15, 20 and regularly checking the signatures of the modules 11, 12, 15, 20 and the certificate 150, 165 to determine whether an unexpected manipulation has occurred in the device 10 and thus in the system 1. The device 10 is then configured for operation. The flow therefore proceeds to a step S4.

In step S4, two different operating states can be selected on the module 16. The operating states can be selected in particular by means of a switch or by an input on a display of the module 16. If the module 16 is switched to the first operating state, which is the engineering operating state described in relation to step S2, the flow returns to step S2. If the module 16 is switched to the second operating state, which is a monitoring operating state, the flow proceeds to a step S5. The second operating state (monitoring operating state) can only be enabled after the engineering process has been completed, i.e. the programming of the device 10 is complete, since the configuration and parameterization of the device 10 has been completed.

In step S5, in which the module 16 is switched to a second operating state (monitoring operating state), all signatures S are generated. Therefore, the module 15 can now aggregate or generate a combined status of the device 10. The generation of the combined status of the device 10 can be repeated after a predetermined period of time. For example, the predetermined period of time is 6 months or a year, or any other configurable period. The duration can be set when configuring the module 15 and/or the module 16. For generating the combined status, the device 15 uses all individual signatures S of the individual modules 11, 12, 15, 16, 20 or uses all individual signatures S. A datum is created as code 150, with which the current controller setup of the device 10 can be audited at a glance in a manipulation-proof manner—by means of, in particular, asymmetric, cryptography. The current controller setup of the device 10 is the overall status of the device 10, which includes the interconnection with the peripheral module 20. This mechanism runs completely independently of the rest of the control system which is executed with the modules 11, 12, in the separate sandbox software container 14 of the controller of the device 10. The sandbox software container 14 comprises at least one of the modules 15, 16. The flow then proceeds to a step S6.

In step S6, at the request of a user 5, the current controller setup of the device 10 is displayed using the apparatus 30, for example the display device thereof, or on the device 10. The display can be produced on the input of a command by a user 5 on the module 15 or module 16. For example, the command is a command to detect the controller setup and/or a command to display the controller setup. This allows the user 5 to reliably detect or determine at a glance whether or not a change has occurred in the control system of the device 10. This monitoring mechanism runs completely independently of the rest of the control system in the separate sandbox software container 14 of the controller of the device 10. The flow then proceeds to a step S7.

In step S7, the module 16 checks whether the current controller setup of the device 10 generated according to step S6 differs from the expected controller setup of the device 10. If the current controller setup generated for device 10 differs from the expected controller setup of device 10, the module 16 detects that an unwanted change, i.e. manipulation, of the device 10 has occurred. The flow therefore proceeds to a step S8. If no manipulation of the device 10 has occurred, the flow returns to step S5.

In step S8, the module 16 uses the data 45 to send an alarm to a higher-level audit system, for example the apparatus 30. The flow then returns to step S4.

The method is completed when the device 10 or the system 1 is switched off.

Figure 3:
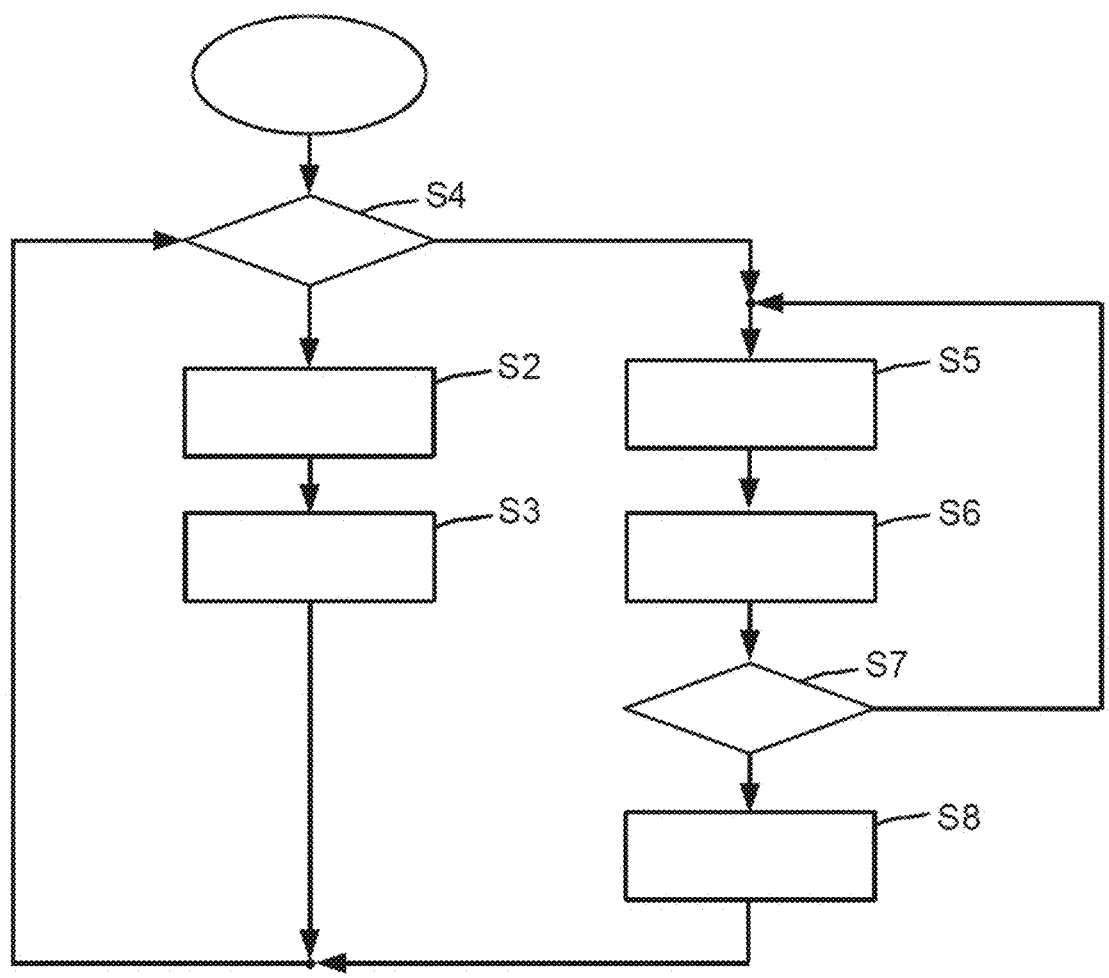
FIG. 3 shows a flowchart of the method of FIG. 2 after restarting the device of FIG. 1.

When the device 10 is switched on again, the device 10 goes into the state according to step S4 as shown in FIG. 3. After restarting the device 10, therefore, it is possible to select whether the device 10 is to be switched to the second operating state (monitoring operating state) according to step S5 described above, or to the first operating state (engineering operating state), in which steps S2 and S3 are executed one after the other. If some authorized change is to be made on the device 10 or the system 1, then using appropriate security measures, such as entering an authentication, in particular a password or biometric data, etc., a user 5 can switch the module 16 into the first operating state (engineering operating state) according to steps S2, S3 described above.

Figure 4:
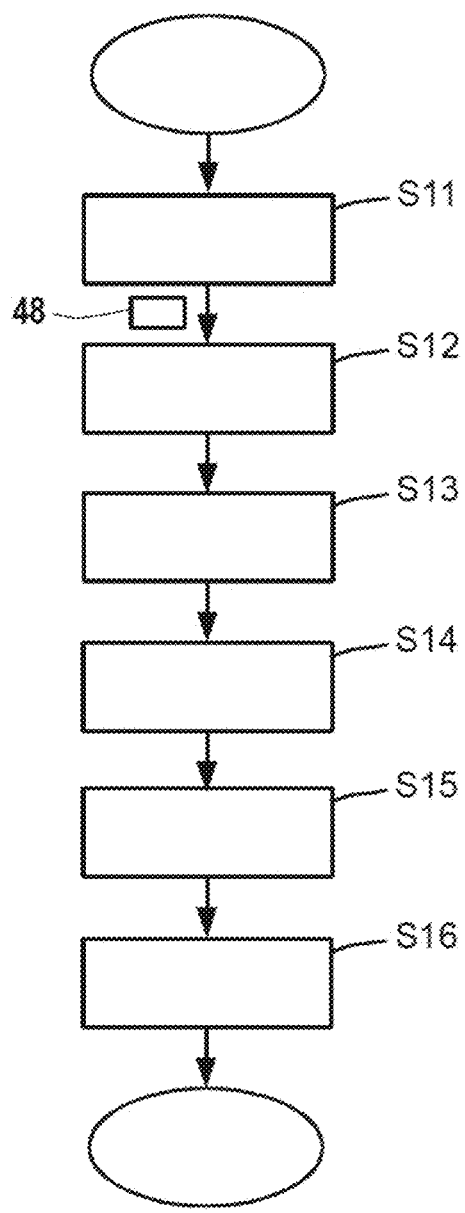
FIG. 4 shows a flowchart of a method for operating a machine according to the first exemplary embodiment.

FIG. 4 illustrates a method for operating a system, such as the system 1. After the start of the method, for example, in a step S11 with a device 10, operating state data are captured as data 48 and prepared for transmission. The operating state data are, in particular, a position of the robot in space, a steam pressure in a boiler or a position of a valve piston, or the size of an electrical current, or the offset relative to an alignment mark, or any other physical quantity. The flow then proceeds to a step S12.

In step S12, the operating state data is issued with the certificate 150, 165 of the device 10 that collected the operating state data. This device 10 is hereafter referred to as the first device 10. The flow then proceeds to a step S13.

In step S13 the data identified in step S12 is sent to a second device 10 as data 48, for example, so that the data 48 can be used, for example, by the application program 122 of the second device 10 for controlling a drive, for example. The flow then proceeds to a step S14.

In step S14, the second device 10 receives the data 48 and checks the data 48 to determine whether the data 48 is trustworthy data. If the data 48 is accompanied by the certificate 150, 165 of the first device 10, the second device 10 accepts the data 48 as trustworthy. Otherwise, the second device 10 discards the data 48 as untrustworthy data. For example, the second device 10 would discard data from the external device 7 as untrustworthy data because the external device 7 cannot add a certificate to its data which is trusted by the devices 10 of the system 1. The flow then proceeds to a step S15.

In step S15, the data 48 identified in step S12 is sent, for example as data 45, to the apparatus 30 so that the data 48 can be evaluated in the apparatus 30, for example by means of a display device. Optionally, the data 45 comprises an IP address and/or a name of the device 10 and/or the apparatus 30. The flow then proceeds to a step S16.

In step S16, the apparatus 30 checks the certificate attached to the data 16 using the certificate 150, 165 of the device 10. Since the first device 10 has issued the data 48 with the certificate 150, the apparatus 30 accepts the data 48 as trustworthy. This means that the data 48 can be further processed. Otherwise, the data 48 is discarded and the apparatus 30 issues a warning message to a user 5.

After that, the method is terminated.

In this way, the data from different devices 10 of the system 1 can no longer be easily confused. This contributes to the correct use of the data and thus to system reliability.

In addition, cryptography can be used with the certificates 150, 165 with little effort. This enables the system 1 also to acquire the capability to easily generate, for example, a tamper-proof representation of the communication relationships between device 10 and peripheral module 20 or a plurality of devices 10 automatically. This improves the usability of the at least one device 10 or the system 1. This also increases the reliability of the device 10 or the system 1, as errors can be discovered more quickly. Furthermore, this helps to keep device or system downtimes as infrequent and short as possible.

According to a second exemplary embodiment, a plurality of devices 10 are combined in a complex, in particular a machine or a machine complex. Thus, in addition to the certificate 150, 165 according to FIG. 1, a certificate can also be created for the complex. In this case, it is not the certificate 150, 165 of the individual devices 10, but the certificate of the complex that is used to indicate the association of the individual devices 10 to the complex.

Thus, only the certificate of the complex needs to be transmitted to the apparatus 30 in the data 45.

This can significantly reduce the amount of data 45, in which all certificates 150, 165 of the individual devices 10 of the complex would otherwise be transmitted to the apparatus 30.

Thus in order to trust the entire complex, upon a request for generating or querying the device identity according to step S7 of FIG. 2, for example, a file transfer of the certificate of the complex to parent or higher-level systems is carried out, such as to the system 1 or the apparatus 30, for example. This can be carried out manually by the user 5 downloading the identity of the complex from a certification device of the complex. Such a user 5 is normally personnel involved in commissioning or maintaining the device 10. Alternatively, the complex identity can be automatically reported to the apparatus 30. The automated notification could be carried out via an appropriate interface, in particular a web interface.

As a result, the complex and/or the system 1 can also be identified as a "unit".

Otherwise, the system 1 according to the present exemplary embodiment is constructed in the same way as described above in relation to the first exemplary embodiment.

All previously described embodiments of the system 1, the device 10 and the above-described method executed using them, can be used individually or in all possible combinations. In particular, all features and/or functions of the previously described exemplary embodiments can be combined as required. In addition, in particular the following modifications are conceivable.

The parts shown in the figures are illustrated schematically and may differ in their exact embodiment from the forms shown in the figures, as long as their features described above are guaranteed.

For example, the communication, in other words, the exchange of data 40, 45, 48 in the system 1, can take place at least partly in a wired manner or at least partly wirelessly. It may be possible to provide alternative or additional means for implementing a near-field communication and/or a long-range communication, which can be selected during a basic parameterization of at least one device 10 and the radio radius of which can be adjusted by means of adjustable radio module parameters.

What is claimed is:

1. A device, comprising:
    at least one memory configured to store data;
    at least one processor configured to process data; and
    at least one additional hardware component that is operated by the at least one processor to perform a task or function of the device,
    wherein the at least one memory stores (i) a configuration module having at least one configuration of the device and (ii) software module having at least one application program that is executed by the at least one processor to perform the task or function of the device, and
    wherein the at least one processor is configured to:
        issue (i) first cryptographic signatures for the configuration module and the at least one configuration of the device and (ii) second cryptographic signatures for the software module and the at least one application program;
        form (i) a first code as an identity of the configuration module, first code being a hash value of the first cryptographic signatures, (ii) a second code as an identity of the software module, the second code being a hash value of the second cryptographic signatures, and (iii) an overall code from the first code and the second code; and
        sign the overall code with a key to issue a unique certificate for the device, which biuniquely identifies the device.

2. The device according to claim 1, wherein at least one of (i) the at least one configuration of the device and (ii) the at least one application program includes at least one parameter for performing the task or function of the device.

3. The device according to claim 1, further comprising:
    at least one peripheral component connected to the device via a data network,
    wherein the at least one processor is further configured to form a third code from a third cryptographic signature of the at least one peripheral component and to form the overall code from the first code, the second code, and the third code.

4. The device according to claim 3, wherein at least one of:
    the device is a modular control device and the data network is a fieldbus,
    the third code is a hash value of the third cryptographic signature, and
    the overall code is a hash value of the first code, the second code, and the third code.

5. The device according to claim 1, wherein:
    the at least one processor has a private key containing a public key, and
    the at least one processor is configured to use the private key to sign the overall code for the device.

6. The device according to claim 5, wherein the at least one processor is further configured to send the public key to the configuration module or the software module in order to check an identity of the configuration module or the software module.

7. A system, comprising:
    a first device comprising:
        at least one first memory configured to store data;
        at least one first processor configured to process data; and
        at least one first additional hardware component that is operated by the at least one first processor to perform a task or function of the first device,
        wherein the at least one first memory stores a first configuration module having at least one first configuration of the first device and (ii) a first software module having at least one first application program that is executed by the at least one first processor to perform the task or function of the first device,
        wherein the at least one first processor is configured to:
            issue (i) a first cryptographic signature for the first configuration module and (ii) a second cryptographic signature for the first software module;
            form (i) a first code as an identity of the first configuration module from the first cryptographic signature, (ii) a second code as an identity of the first software module from the second cryptographic signature, and (iii) a first overall code from the first and second codes; and
            sign the first overall code with a first key to issue a unique certificate for the first device, which biuniquely identifies the first device; and
    a second device comprising:
        at least one second memory configured to store data;
        at least one second processor configured to process data; and
        at least one second additional hardware component that is operated by the at least one second processor to perform a task or function of the second device,
        wherein the at least one second memory stores a second configuration module having at least one second configuration of the second device and (ii) a second software module having at least one second application program that is executed by the at least one second processor to perform the task or function of the second device, wherein the at least one second processor is configured to:
  issue (i) a third cryptographic signature for the second configuration module and (ii) a fourth cryptographic signature for the second software module;
  form (i) a third code as an identity of the second configuration module from the third cryptographic signature, (ii) a fourth code as an identity of the second software module from the fourth cryptographic signature, and (iii) a second overall code from the third and fourth codes; and
  sign the second overall code with a second key to issue a unique certificate for the second device, which biuniquely identifies the second device,
wherein the first device is control device,
wherein the second device is a drive device, a tool, or a transport device, and
wherein the first and the second devices are configured to permit an exchange of data when exchanging data with another device of the system or a higher-level apparatus, only when the data are provided with a sub-certificate.

8. The system according to claim 7, wherein the data are operating state data or comprise a control command of first device or the second device.

9. The system according to claim 7, wherein:
the data comprise at least one parameter for controlling a drive of at least one element of the system, and/or
the data comprise an IP address and/or a name of the first device or the second device.

10. The system according to claim 7, further comprising:
an apparatus arranged externally to the first device or the second device and configured to store the unique certificate of the first device or the unique certificate of the second device,
wherein the apparatus configured to check data received from the first device or the second device for trustworthiness using the corresponding unique certificate.

11. A method for verifying an integrity status of a device having at least one memory that stores (i) a configuration module having at least one configuration of the device and (ii) a software module having at least one application program that is executed by at least one processor of the device to perform a task or function of the device, the method comprising:
  issuing, with the at least one processor of the device, (i) first cryptographic signatures for the configuration module and the at least one configuration of the device and (ii) second cryptographic signatures for the software module and the at least one application program;
  forming, with the at least one processor of the device, a first code as an identity of the configuration module, first code being a hash value of the first cryptographic signatures;
  forming, with the at least one processor of the device, a second code as an identity of the software module, the second code being a hash value of the second cryptographic signatures;
  forming, with the at least one processor of the device, an overall code from the first code and the second code; and
  signing, with the at least one processor of the device, the overall code with a key to issue a unique certificate for the device, which biuniquely identifies the device.

12. The method according to claim 11, further comprising:
  checking, with the at least one processor of the device, after receiving a predetermined command, that a unique certificate currently created for the device matches a unique certificate stored for the device, and
  outputting, with the at least one processor of the device, data that indicate a manipulation of the unique certificate currently created for the device when the unique certificate currently created for the device does not match the unique certificate stored for the device.

* * * * *